United States Patent [19]

Siegenthaler

[11] Patent Number: 5,798,018
[45] Date of Patent: Aug. 25, 1998

[54] WINDING UNIT FOR FORMING A TOROIDAL CARCASS FOR A ROAD VEHICLE TIRE

[75] Inventor: Karl J. Siegenthaler, Pratteln, Switzerland

[73] Assignee: Bridgestone Corporation, Tokyo, Japan

[21] Appl. No.: 769,235

[22] Filed: Dec. 18, 1996

[30] Foreign Application Priority Data

Dec. 19, 1995 [IT] Italy .................. TO95A1028

[51] Int. Cl.$^6$ .......................................... B29D 30/34
[52] U.S. Cl. .................................. 156/397; 156/117
[58] Field of Search ........................... 156/397, 117, 156/130.7, 133, 123

[56] References Cited

U.S. PATENT DOCUMENTS

| | | | |
|---|---|---|---|
| 3,057,396 | 10/1962 | Hanson | 156/397 |
| 4,052,237 | 10/1977 | Appleby et al. | 156/117 |
| 5,308,432 | 5/1994 | Siegenthaler | 156/397 |
| 5,453,140 | 9/1995 | Laurent et al. | 156/117 |

FOREIGN PATENT DOCUMENTS 283046  1/1928  United Kingdom.

*Primary Examiner*—Geoffrey L. Knable
*Attorney, Agent, or Firm*—Carmen S. Santa Maria

[57] ABSTRACT

A winding unit (14) for forming a toroidal carcass (1) by winding a textile cord (5) in a spiral about a toroidal frame (7) defined by two coaxial annular beads (2) and by a removable annular element (9) located outwards of the beads (2) to define, with the beads (2), two annular openings (11); the unit (14) presenting a plate element (16) releasably connectable to the annular element (9), and a sprocket chain (27) supporting a spool (43) for the cord (5), and movable continuously, along a groove (25) formed on the plate element (16) and defining an endless path (P), to form a toroidal reticulated structure (4) about the annular element (9) and the beads (2); the endless path (P) presenting a C-shaped branch (P1) extending, in use, about the annular element (9), and an omega-shaped branch (P2) extending about a hole (21) for the passage of a respective bead (2), about the annular element (9), and through the two annular openings (11).

9 Claims, 5 Drawing Sheets

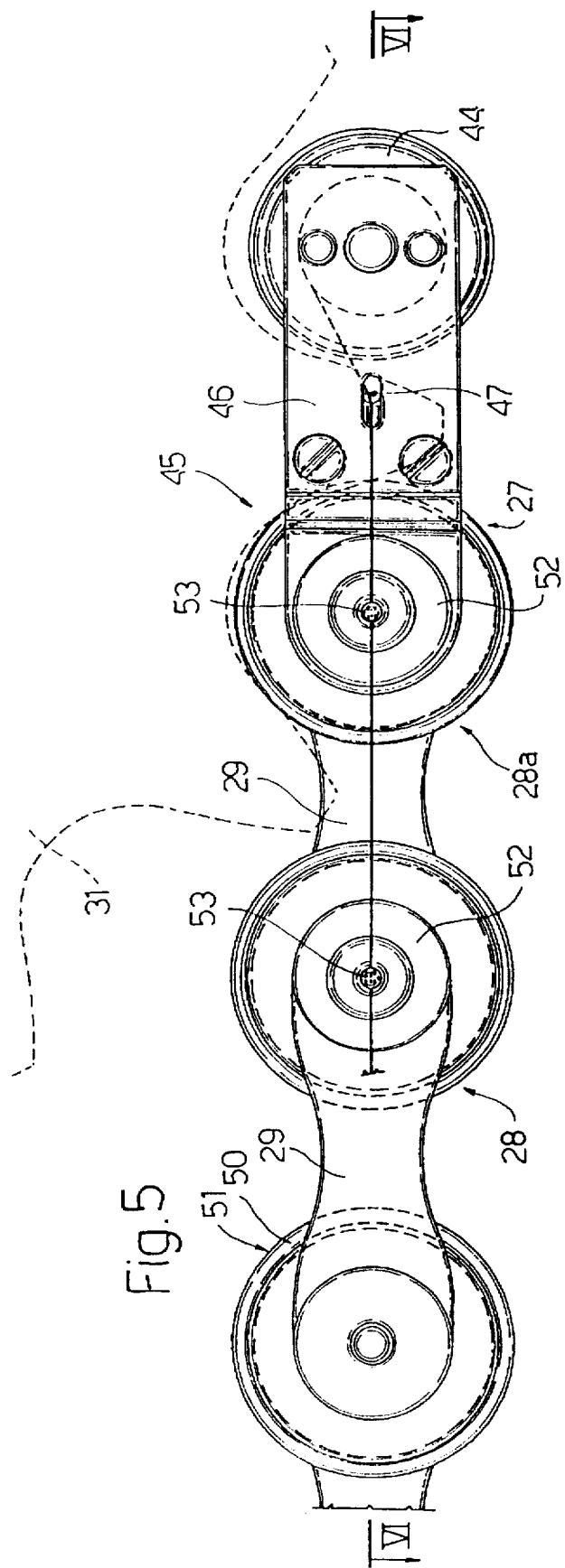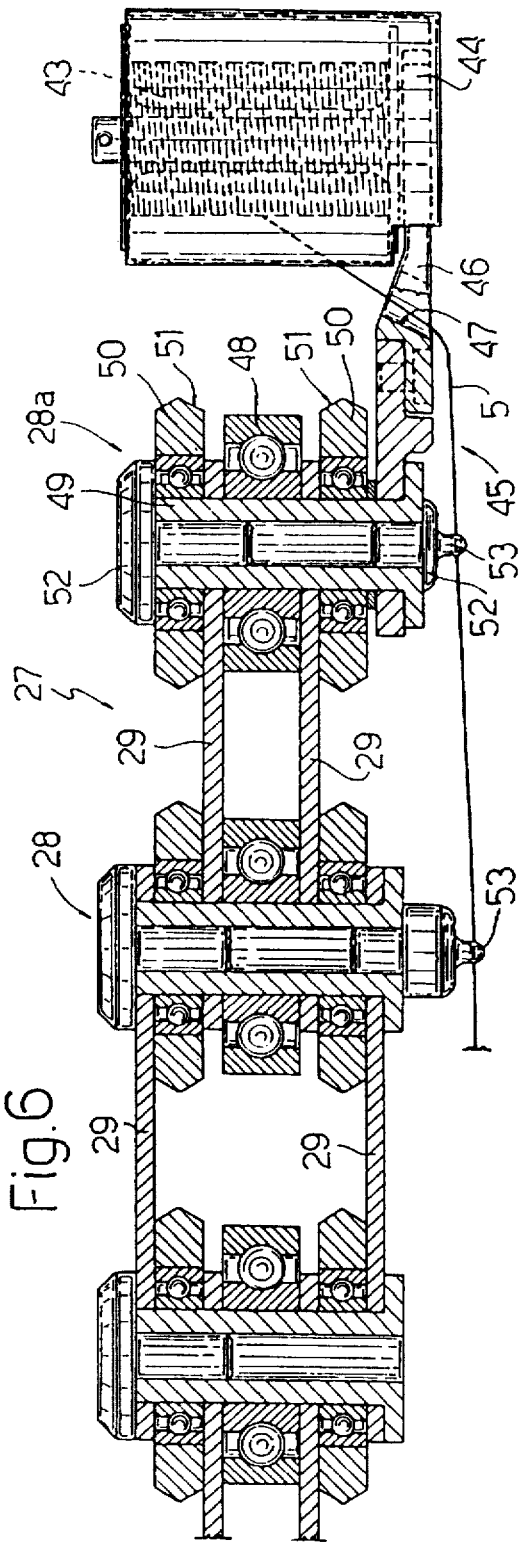

WINDING UNIT FOR FORMING A TOROIDAL CARCASS FOR A ROAD VEHICLE TIRE

BACKGROUND OF THE INVENTION

The present invention relates to a winding unit for forming a toroidal carcass for a road vehicle tire.

More specifically, the present invention relates to a unit for forming a toroidal carcass of the type comprising two annular beads presenting respective fillers, and a toroidal reticulated structure connecting the beads and defined by at least one continuous cord wound about the beads and about a removable annular element, which is located radially outwards of, and centered axially in relation to, the two beads to define, with the beads, a toroidal frame presenting two annular openings and rotating about a given axis of rotation.

EP-A-O 549 868 relates to a unit of the above type, comprising a winding device for winding at least one continuous cord along a spiral path about the frame and beads, and wherein each turn of the spiral comprises a first portion extending outside the annular element and the beads, and a second portion extending outside the annular element and through both said annular openings.

In EP-A-O 549 868, the winding device comprises a carriage supporting a spool for the cord; and a guide device for guiding the carriage along a flat winding path, and in turn comprising a substantially U-shaped fixed annular guide partly surrounding the annular element and facing both the annular openings, and two substantially U-shaped movable annular guides, which are movable between a closed position, wherein each movable annular guide is associated with and partly surrounds a respective bead, and is tangent to the fixed annular guide at two distinct points of tangency on either side of the respective annular opening to form a closed-loop winding path, and an idle position wherein each movable annular guide is dissociated from the respective bead, and is tangent to the fixed annular guide at only one of said two points to open the winding path.

The above known unit presents several drawbacks in that, the fixed annular guide and the movable annular guides being separate and tangent to one another at said points, switching elements are required at the points of tangency to transfer the carriage from the fixed annular guide to the movable annular guides, and vice versa, and to direct the carriage along the closed-loop winding path in such a manner as to wind the continuous cord along said spiral path about the frame and beads. In addition to complicating the design and manufacture of the unit, the fixed and movable annular guides and the switching elements also complicate the movement of the carriage along the guides.

SUMMARY OF THE INVENTION

It is an object of the present invention to provide a straightforward, low-cost winding unit for forming a toroidal carcass for a road vehicle tire, and designed to overcome the aforementioned drawbacks.

According to the present invention, there is provided a winding unit for forming a toroidal carcass for a road vehicle tire by winding a textile cord in a spiral about a toroidal frame rotating about an axis of rotation and defined by two annular beads and by a removable annular element located radially outwards of the beads and centered axially in relation to the beads so as to define, with the beads, two annular openings; the unit being characterized by comprising a substantially U-shaped plate element, in turn comprising two arms for surrounding said annular element, each arm presenting a hole for the passage of a respective bead and a respective bead filler; a groove formed on the plate element and defining an endless path comprising a first branch extending, in use, about said annular element, and a second branch extending about said holes, about said annular element, and through said openings; a flexible element mounted so as to roll along said path; feed means connected to the flexible element and for feeding the flexible element continuously along said path; and a spool for said cord, fitted in rotary manner to said flexible element.

BRIEF DESCRIPTION OF THE DRAWINGS

A non-limiting embodiment of the present invention will be described by way of example with reference to the accompanying drawings, in which:

FIG. 5 shows a larger-scale view of a detail in FIG. 1;

FIG. 6 shows a section along line VI—VI in FIG. 5;

DETAILED DESCRIPTION OF THE INVENTION

Figure 8:
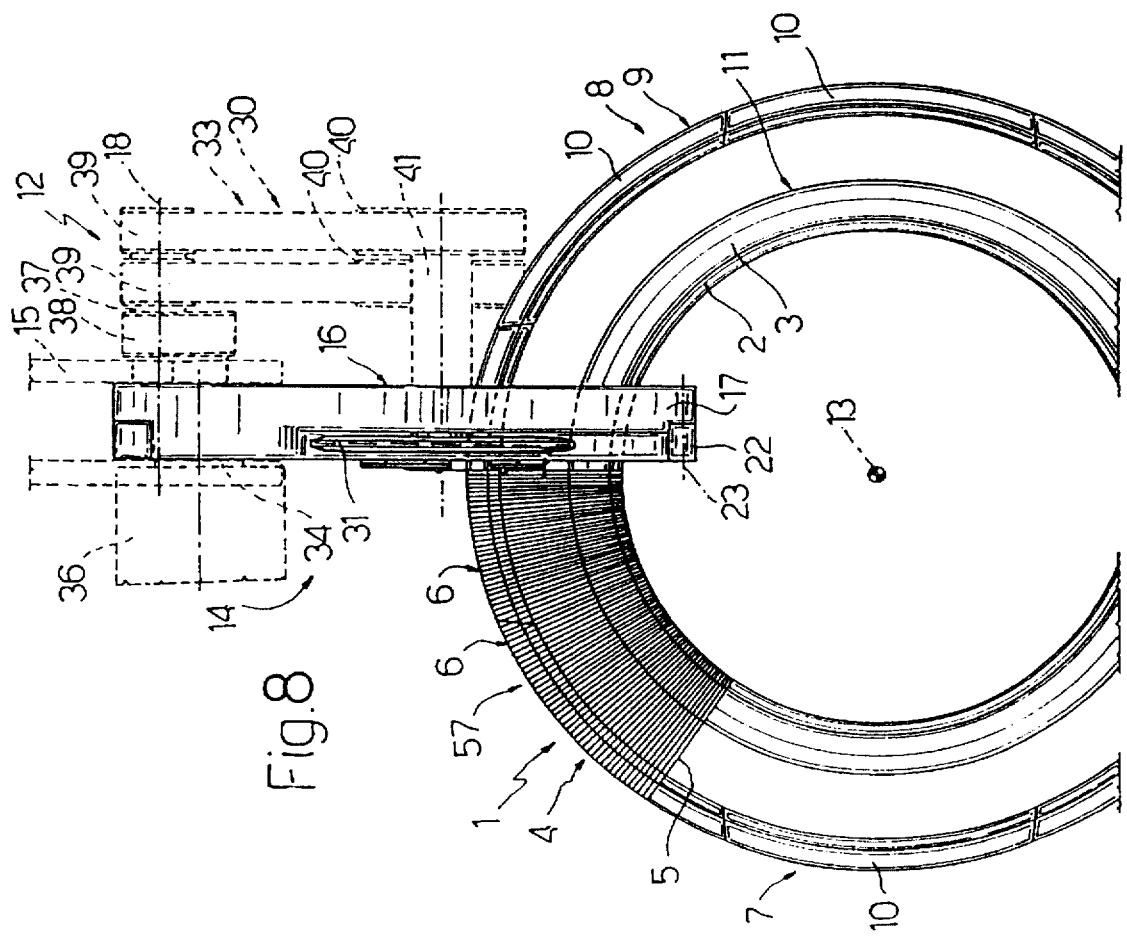
FIG. 8 shows the FIG. 1 unit together with a toroidal frame for supporting a toroidal carcass.

With reference to FIG. 8, number 1 indicates a toroidal carcass for a road vehicle tire.

Carcass 1 comprises two annular beads 2 presenting respective fillers 3; and a toroidal reticulated structure 4 connecting beads 2 and defined by at least one continuous textile cord 5 wound in a spiral about beads 2 in laterally-contacting turns 6. Each turn 6 defines an elongated reinforcing element connecting, and extending substantially radially in relation to, beads 2.

Carcass 1 as described above is formed on a supporting frame 7 comprising an inner portion defined by beads 2, and a removable auxiliary outer portion 8 defined by a ring 9 comprising a number of releasably-connected curved segments 10. Ring 9 is located radially outwards of beads 2, and is centered axially in relation to the two beads 2 to define, with beads 2, two annular openings 11.

Figure 1:
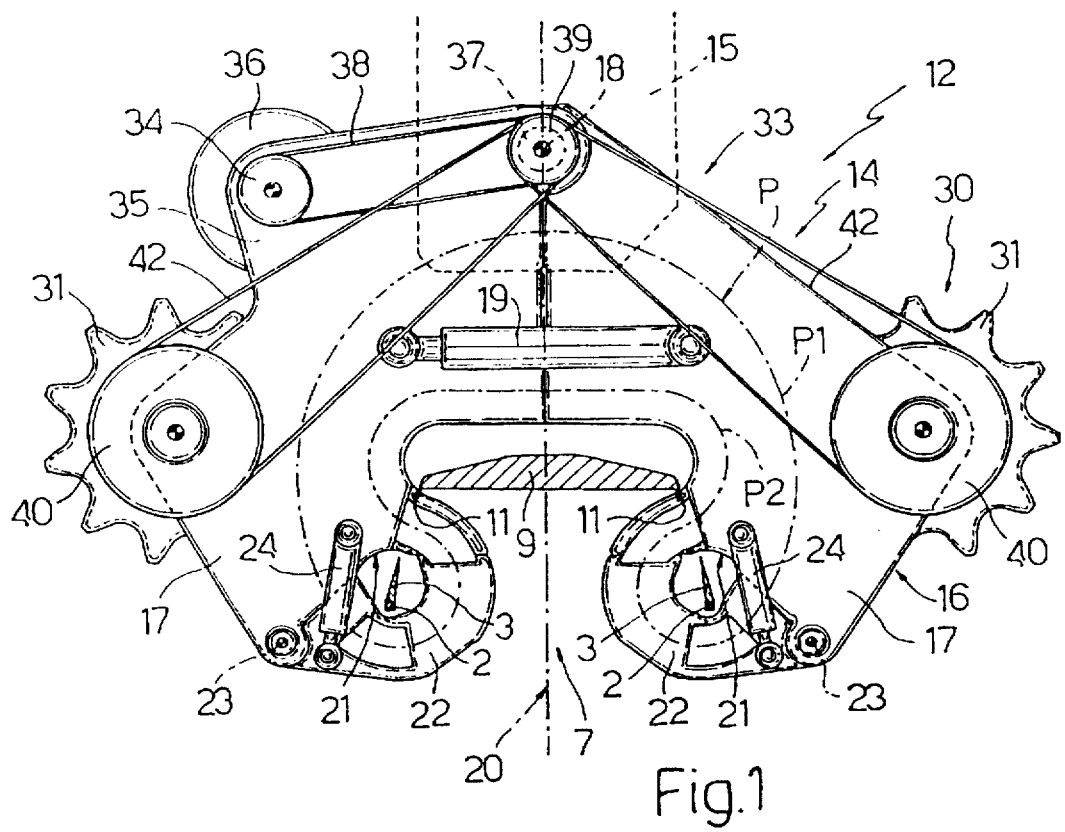
FIGS. 1 and 2 show schematic side views, in two different operating positions, of a preferred embodiment of the winding unit for forming a toroidal carcass according to the present invention.
Figure 2:
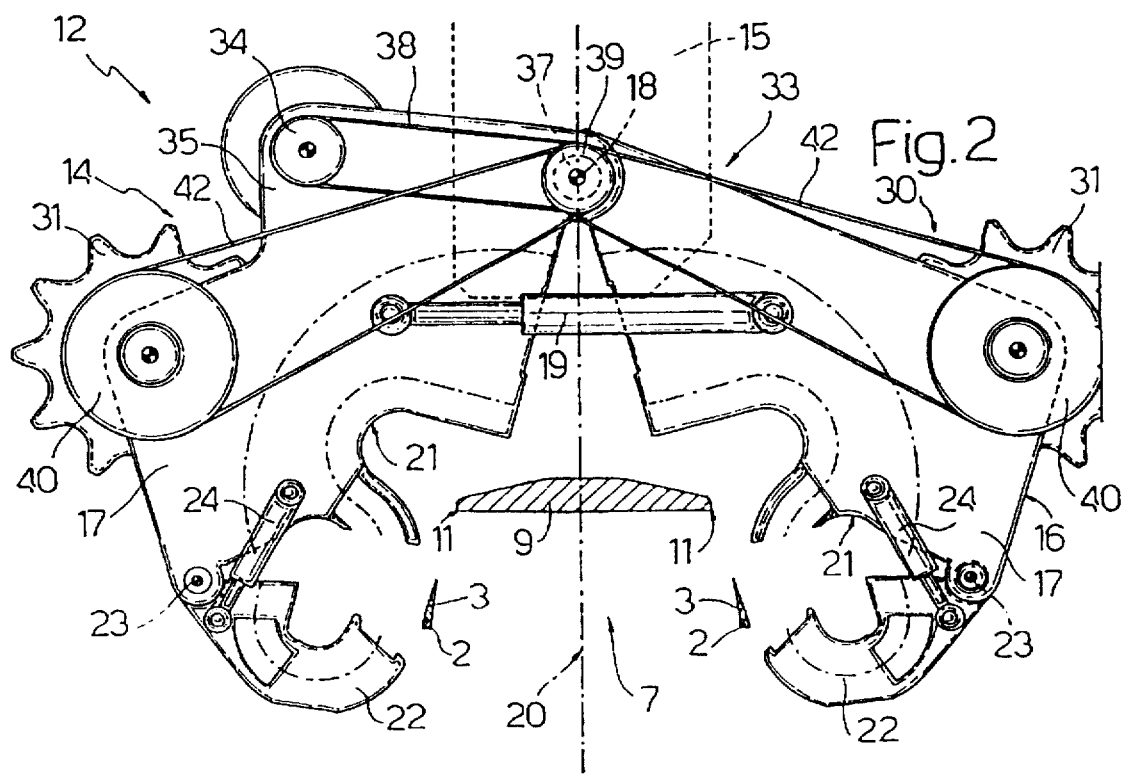
Figure 3:
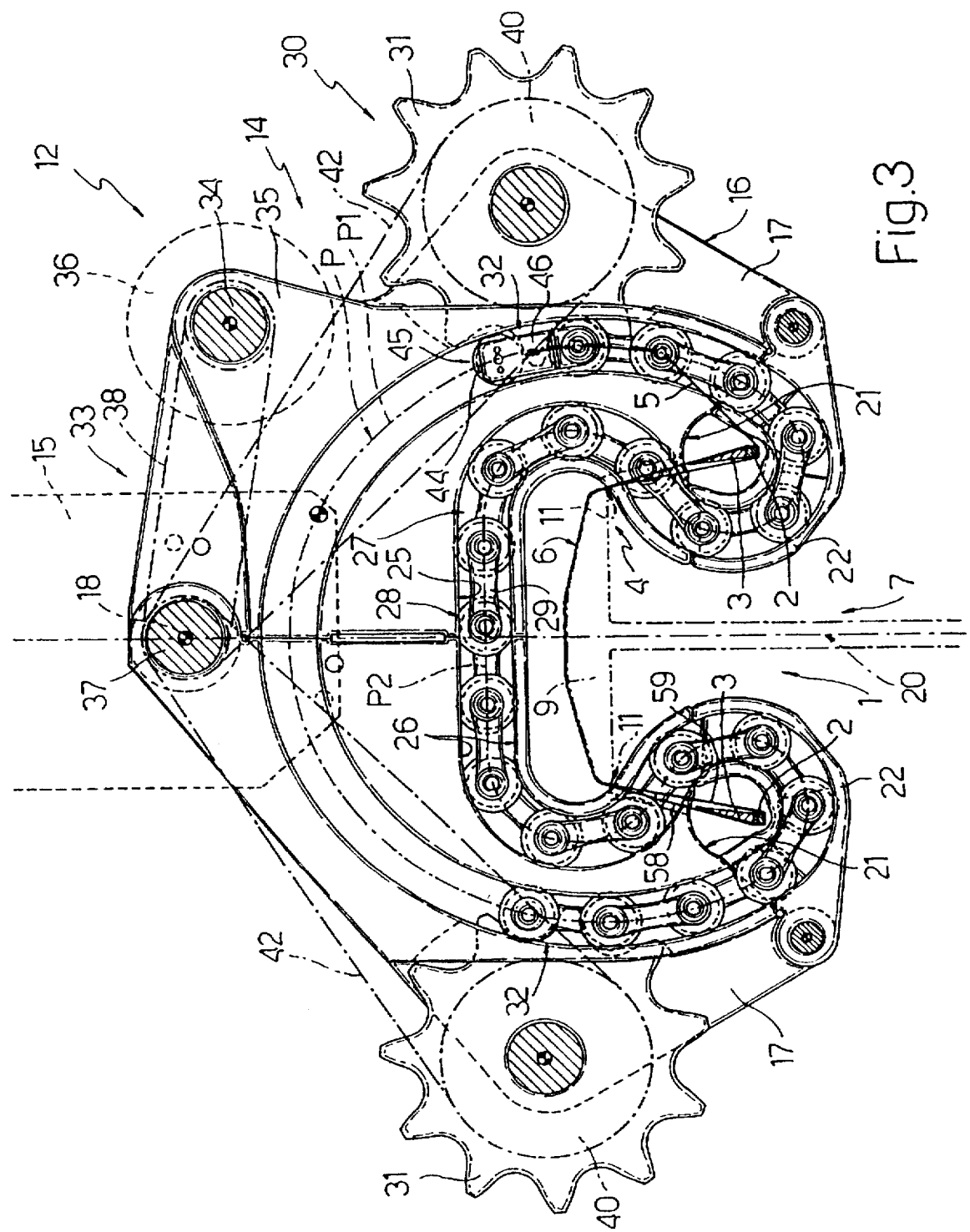
FIGS. 3 and 4 show larger-scale views, with parts in section and parts removed for clarity, corresponding to FIGS. 1 and 2.
Figure 4:
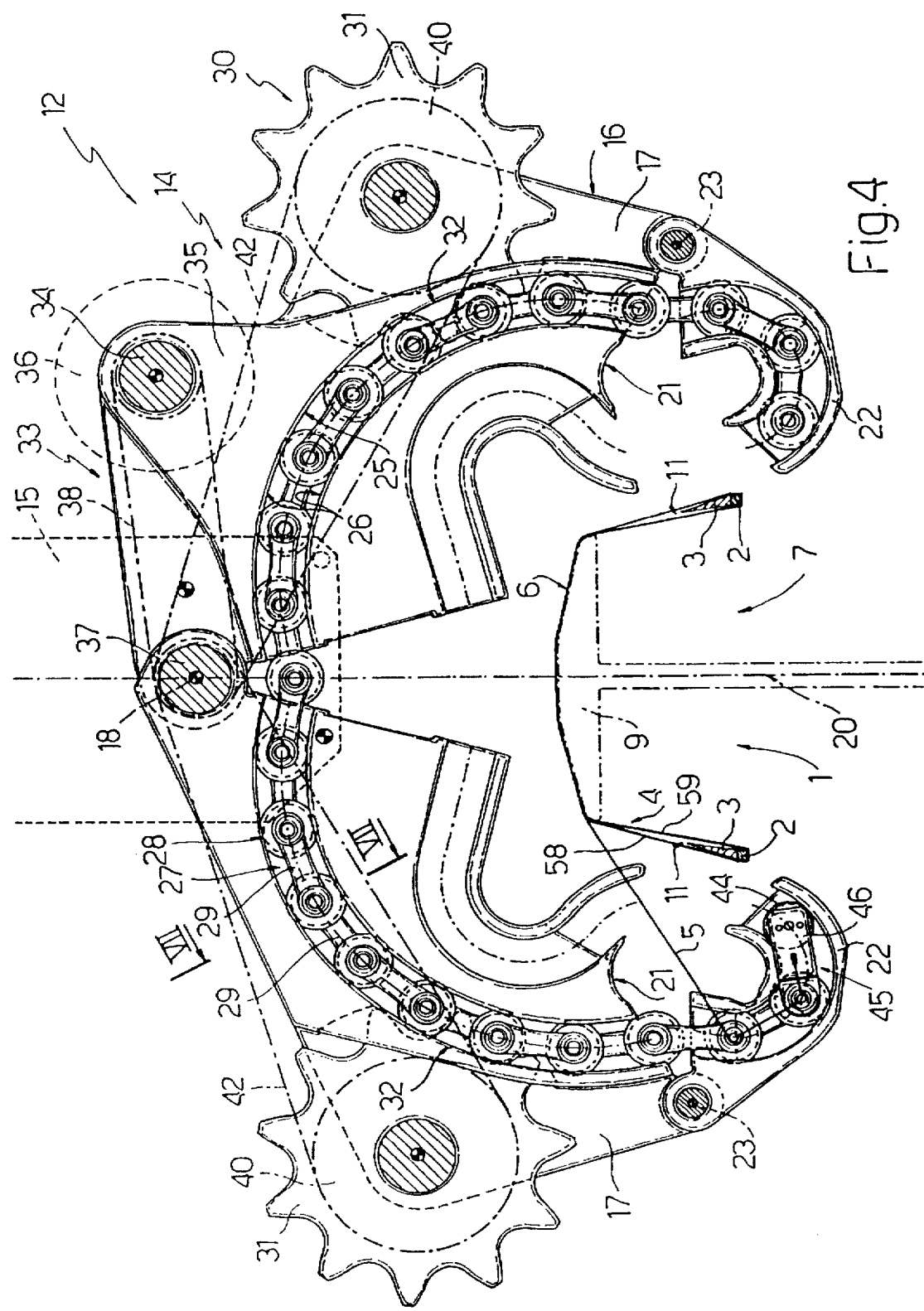

As shown in FIG. 1, ring 9 forms part of an assembly 12 for forming carcass 1, and which comprises a known device (not shown) for supporting and activating frame 7 and rotating frame 7 about its axis 13, and a winding unit 14 for winding cord 5 in a spiral about frame 7, and supported substantially over frame 7 by a respective supporting frame 15.

As shown in FIGS. 1 to 4, winding unit 14 comprises a substantially U-shaped plate element 16 in turn comprising two arms or jaws 17 for surrounding ring 9. For which purpose, jaws 17 are rotated in relation to each other, about an axis 18 crosswise to axis 13 and by a linear actuator 19 connected to both jaws 17, between an open position (FIGS. 2 and 4) permitting the passage of ring 9 between jaws 17, and a closed position (FIGS. 1 and 3) wherein jaws 17 surround ring 9 symmetrically with each other in relation to the plane of symmetry 20 of plate element 16.

3

At the free end opposite the end pivoting about axis 18, each jaw 17 presents a hole 21 for the passage of a respective bead 2 and respective filler 3, and comprises a hook element 22 which, by means of a respective linear actuator 24 connected to element 22 and to respective jaw 17, is movable, about a respective axis of rotation 23 parallel to axis 18, between a closed position (FIGS. 1 and 3), wherein respective hole 21 is closed and element 22 is located through respective annular opening 11, and an open position (FIGS. 2 and 4), wherein respective hole 21 is open and element 22 is located outside respective annular opening 11. More specifically, elements 22 are set to their respective closed positions closing respective holes 21 when, in use, jaws 17 are also set to the closed position; and are set to their respective open positions when, in use, jaws 17 are also set to the open position.

Figure 7:
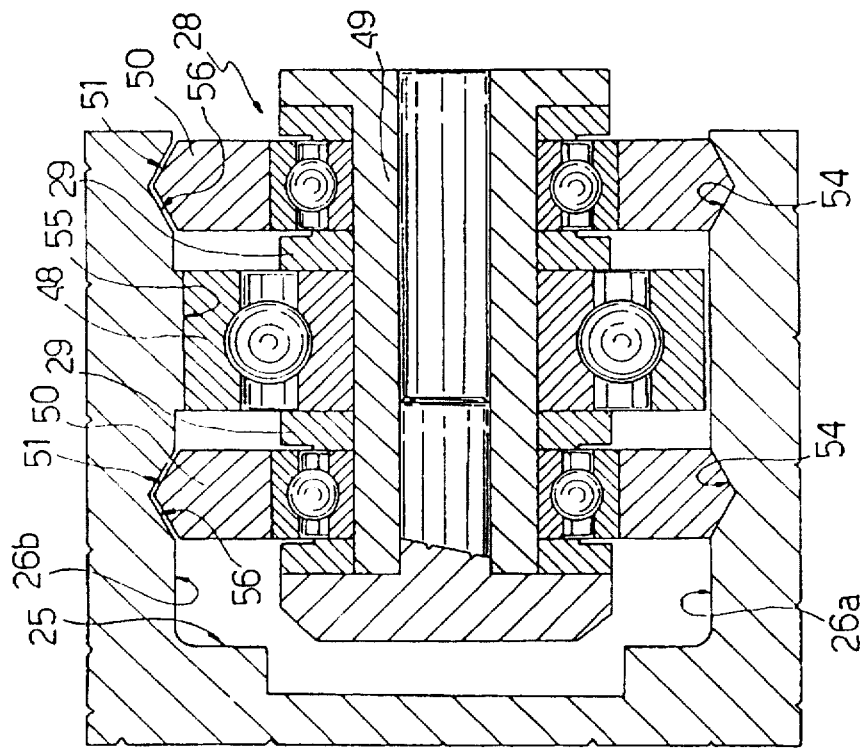
FIG. 7 shows a section along line VII—VII in FIG. 4.

Winding unit 14 also comprises a substantially U-shaped groove 25 formed on plate element 16 and defined, as shown more clearly in FIG. 7, by two rolling surfaces 26 parallel to and facing each other. When, in use, jaws 17 are set to the closed position, groove 25 defines an endless path P comprising two branches P1 and P2. Branch P1 is substantially C-shaped with its concavity facing ring 9, and extends along jaws 17 about ring 9; while branch P2 is substantially omega-shaped, and presents a portion extending along jaws 17, inwards of branch P1, about ring 9 and through annular openings 11, and a further portion extending along elements 22 about respective holes 21.

Winding unit 14 also comprises a flexible element defined by a sprocket chain 27 housed in rolling manner inside groove 25 and presenting a number of pins 28 and a number of elongated plates 29 connecting pins 28; and a feed device 30 connected to and for feeding chain 27 continuously along path P, and in turn comprising two sprockets 31 fitted in rotary manner to respective jaws 17 along branch P1 and at respective feed points 32 located symmetrically in relation to said plane of symmetry.

Device 30 also comprises a transmission 33 fitted to plate element 16, on the opposite side of element 16 to groove 25, and in turn comprising a drive shaft 34 mounted for rotation through an end portion 35 of one of jaws 17 and connected to a motor 36; a countershaft 37 fitted in rotary manner to frame 15, coaxially with axis 18, and connected to shaft 34 by an endless belt 38; and, for each sprocket 31, a pulley 39 fitted to shaft 37, a further pulley 40 fitted to one end of a respective shaft 41, the other end of which is mounted for rotation through respective jaw 17 and supports respective sprocket 31, and an endless belt 42 connecting pulleys 39 and 40.

Device 30 provides for simultaneously rotating sprockets 31 clockwise, in FIGS. 1–4, to feed chain 27 along path P, and chain 27 presents such a length L as to engage at least one of sprockets 31 at all times, regardless of the position of chain 27 along path P.

As shown in FIGS. 5 and 6, winding unit 14 also comprises a spool 43 for cord 5; and a cartridge 44 supporting spool 43 for rotation about a respective axis parallel to axis 18, and itself fitted to a free end 45 of chain 27 by means of a respective elongated plate 46 presenting a through hole 47 for the passage of cord 5 and connected to an end pin 28a located at free end 45.

As shown in FIG. 6, each pin 28 comprises a rolling bearing 48; a tubular shaft 49 supporting bearing 48 and coaxial with a respective axis parallel to axis 18; two disks 50 fitted in rotary manner to shaft 49 on either side of bearing 48, and presenting respective substantially V-shaped

4 outer peripheral profiles 51; and two outer caps 52 for gripping bearing 48, disks 50 and the ends of four plates 29, two of which are located between respective caps 52 and disks 50, and two of which are located between respective disks 50 and bearing 48.

End pin 28a of chain 27 is connected to the adjacent pin 28 by only two plates 29, the ends of which are located between respective disks 50 and bearing 48, and supports plate 46 between one of disks 50 and the respective cap 52. Both pin 28a and the adjacent pin 28 present respective rings 53 supporting in sliding manner cord 5 and located outside respective caps 52 on the same side as plate 46.

One rolling surface 26a of said two surfaces 26 presents a pair of shaped rolling tracks 54 complementary to peripheral profiles 51 and engaged by disks 50; and the other rolling surface 26b of said two surfaces 26 presents a raised rolling track 55 cooperating with bearing 48, which is only permanently in radial contact with track 55. Rolling surface 26b also presents a further pair of shaped rolling tracks 56 complementary to peripheral profiles 51 and for laterally guiding disks 50, which are only permanently in radial contact with tracks 54 on rolling surface 26a, and contact tracks 56 on rolling surface 26b to limit any distortion of chain 27.

In actual use, before commencing the formation of carcass 1, jaws 17 and elements 22 are set to the open position to permit insertion of frame 7 beneath winding unit 14.

Jaws 17 are then set by the actuator to the closed position so that branch P1 of path P surrounds ring 9; and elements 22 are also set to the closed position about respective beads 2 and through respective annular openings 11 so as to close respective holes 21 and connect branches P1 and P2 of path P.

At this point, one end of cord 5 on spool 43 is knotted manually to one of beads 2, and motor 36 of feed device 30 is operated to roll chain 27 along path P inside groove 25.

As it does so, chain 27 also feeds spool 43 along path P, and, in conjunction with rotation of frame 7 about respective axis 13 by said supporting and activating device, cord 5 is wound about frame 7 along a spiral path 57 comprising a number of laterally-contacting turns 6, each comprising two portions 58 and 59; portion 58 extending outside frame 7, and portion 59 extending outside ring 9 but through both annular openings 11 and being connected to two adjacent portions 58 by the two beads 2.

Proceeding as described above, substantially the whole of frame 7 is wound with cord 5. Obviously, a final portion of frame 7, substantially equal in length to the thickness of winding unit 14, is completed differently, e.g. by placing cord 5 manually along the relative path portion 58.

Once carcass 1 is completed, jaws 17 and elements 22 are opened to extract carcass 1 and insert a new frame 7.

I claim:

1. A winding unit (14) for forming a toroidal carcass (1) for a road vehicle tire by winding a textile cord (5) in a spiral about a toroidal frame (7) rotating about an axis of rotation (13) and defined by two annular beads (2) and by a removable annular element (9) located radially outwards of the beads (2) and centered axially in relation to the beads (2) so as to define, with the beads (2), two annular openings (11); the unit (14) being characterized by comprising a substantially U-shaped plate element (16), in turn comprising two arms (17) for surrounding said annular element (9), each arm (17) presenting a hole (21) for the passage of a respective bead (2) and a respective bead filler (3); a groove (25) formed on the plate element (16) and defining an endless path (P) comprising a first branch (P1) extending, in use, about said annular element (9), and a second branch (P2) extending about said holes (21), about said annular element (9), and through said openings (11); a flexible element (27) mounted so as to roll along said path (P); feed means (30) connected to the flexible element (27) and for feeding the flexible element (27) continuously along said path (P); and a spool (43) for said cord (5), fitted in rotary manner to said flexible element (27).

2. A unit as claimed in claim 1, characterized in that said flexible element (27) is defined by a sprocket chain (27) in turn defined by a number of pins (28) and elongated plates (29) arranged alternately in series inside said groove (25); said spool (43) being fitted in rotary manner to a supporting cartridge (44) at a free end (45) of said chain (27).

3. A unit as claimed in claim 2, characterized in that said feed means (30) comprise two sprockets (31) located along said groove (25) at respective feed points (32); the chain (27) presenting such a length (L) as to engage at least one of said two sprockets (31) at all times, regardless of the position of the chain (27) along said path (P).

4. A unit as claimed in claim 3, characterized in that said plate element (16) presents a plane of symmetry (20); said feed points (32) being located symmetrically in relation to the plane of symmetry (20).

5. A unit as claimed in claim 3, characterized in that said groove (25) is defined by two rolling surfaces (26) parallel to and facing each other.

6. A unit as claimed in claim 5, characterized in that each pin (28) comprises a rolling bearing (48); a shaft (49) supporting the bearing (48); and two disks (50) fitted in rotary manner to the shaft (49), on either side of the bearing (48), and presenting respective substantially V-shaped outer peripheral profiles (51).

7. A unit as claimed in claim 6, characterized in that a first rolling surface (26a) of said two rolling surfaces (26) presents a pair of shaped rolling tracks (54) complementary to said peripheral profiles (51) and engaged by said disks (50); and a second rolling surface (26b) of said two rolling surfaces (26) presents a raised rolling track (55) cooperating with said bearing (48); the bearing (48) only being in radial contact with said raised track (55).

8. A unit as claimed in claim 7, characterized in that said second rolling surface (26b) of said two rolling surfaces (26) presents a further pair of shaped rolling tracks (56) complementary to said peripheral profiles (51) and for laterally guiding said disks (50); said disks (50) only being in permanent radial contact with the pair of shaped rolling tracks (54) on said first rolling surface (26a).

9. A unit as claimed in claim 1, characterized in that said two arms (17) are defined by respective jaws (17) movable between an open position permitting passage of the annular element (9) between the jaws (17), and a closed position; each jaw (17) presenting a hole (21) for the passage of a respective bead (2) and a respective bead filler, and comprising, at the free end, an element (22) movable between a closed position closing the respective said hole (21), and an open position opening the respective said hole (21).

* * * * *